Sept. 25, 1945.　　　H. B. PETERSON, JR　　　2,385,642
CAB STRUCTURE FOR DIESEL ENGINES
Filed June 27, 1942　　　3 Sheets-Sheet 1
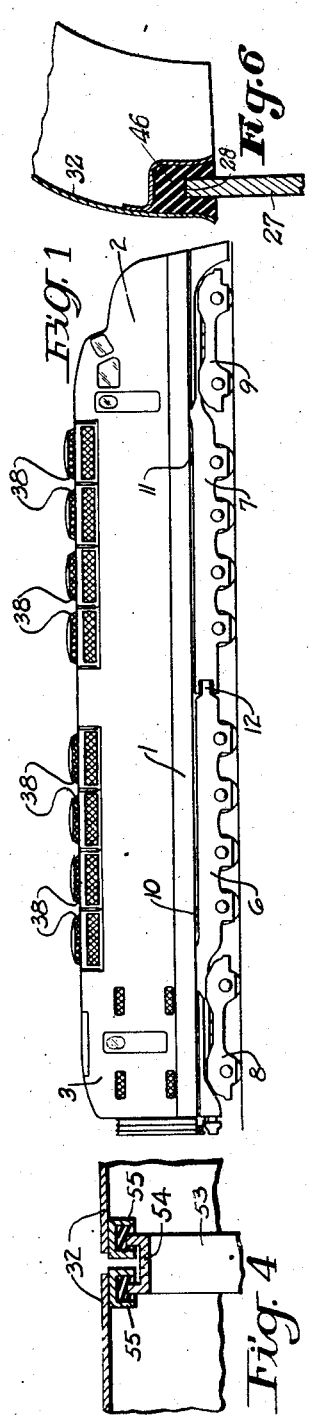
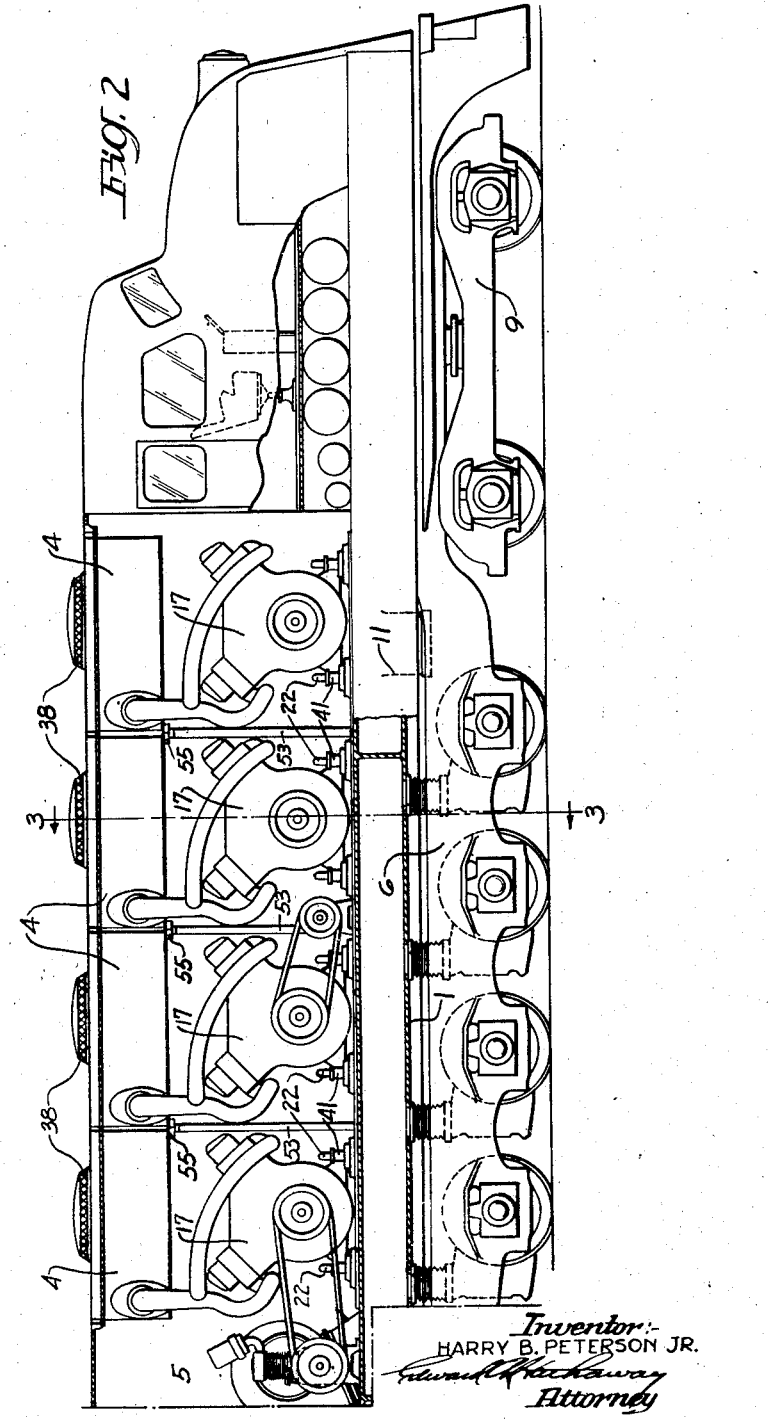
Inventor:-
HARRY B. PETERSON JR.
Attorney

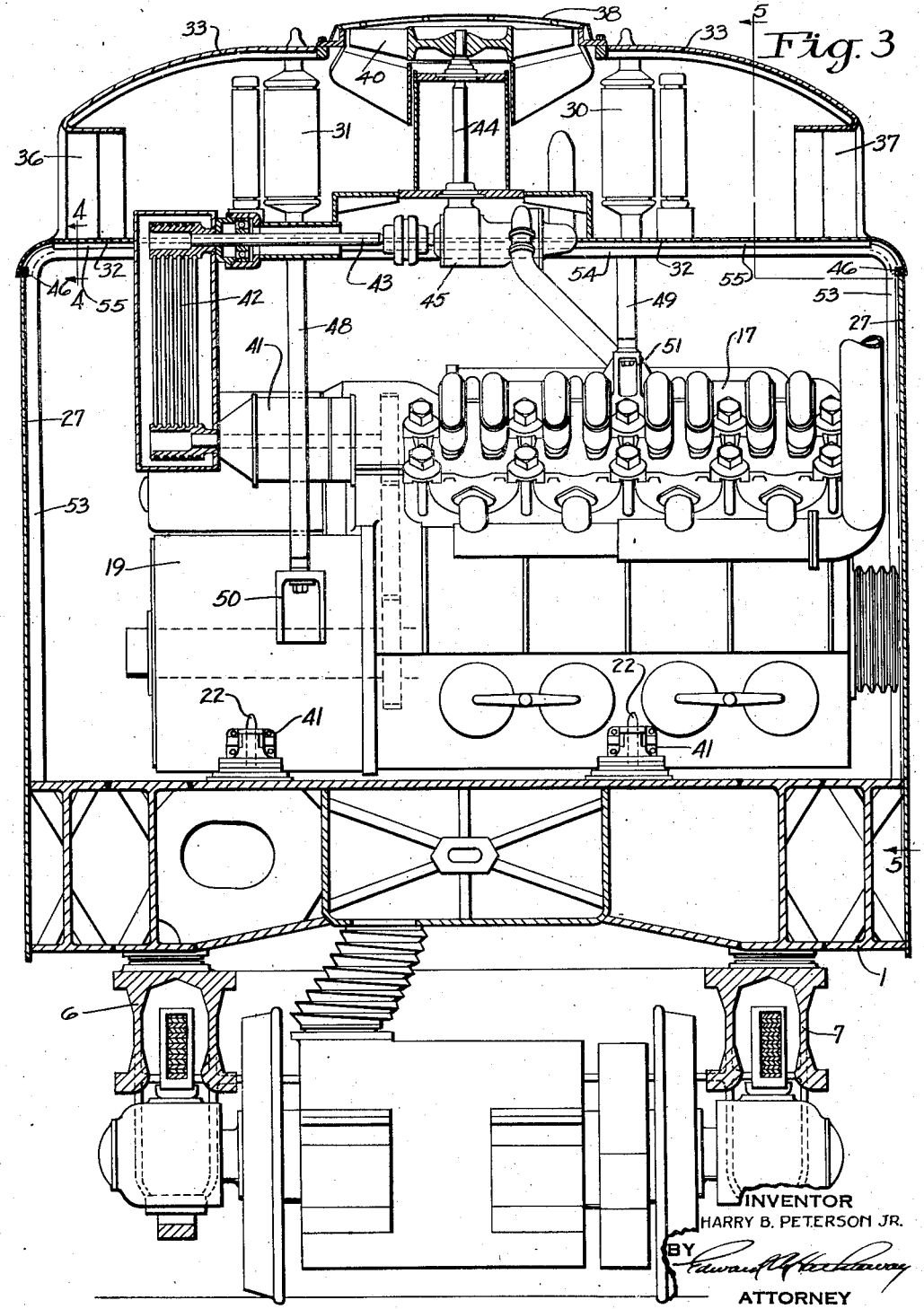

Sept. 25, 1945.   H. B. PETERSON, JR   2,385,642
CAB STRUCTURE FOR DIESEL ENGINES
Filed June 27, 1942   3 Sheets-Sheet 3
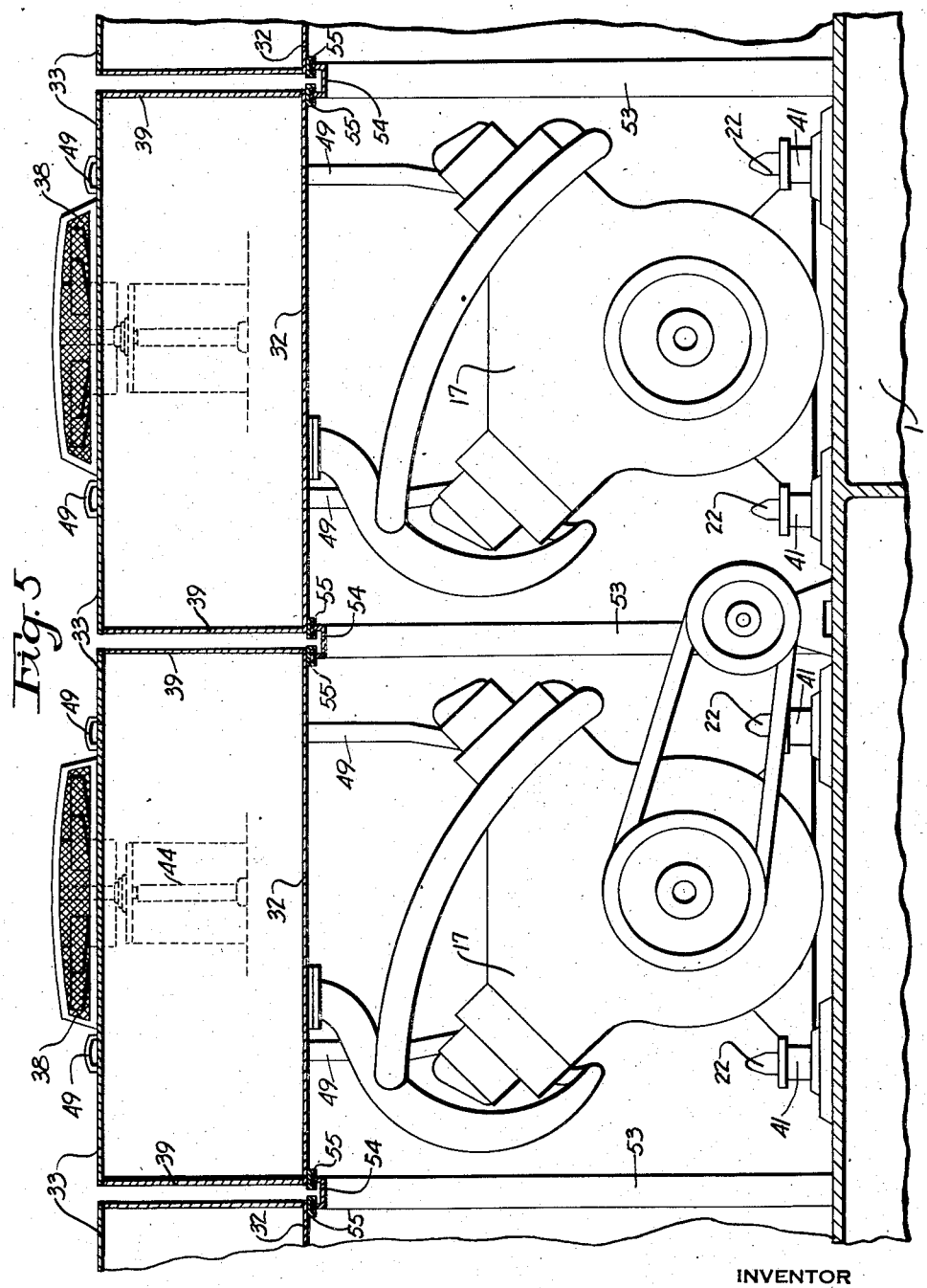
INVENTOR
HARRY B. PETERSON JR.
BY
ATTORNEY Patented Sept. 25, 1945

2,385,642

UNITED STATES PATENT OFFICE 2,385,642

CAB STRUCTURE FOR DIESEL ENGINES

Harry B. Peterson, Jr., Drexel Hill, Pa., assignor to The Baldwin Locomotive Works, a corporation of Pennsylvania Application June 27, 1942, Serial No. 448,817

7 Claims. (Cl. 105—35)

This invention relates generally to internal combustion engine locomotives and more particularly to an improved cab for locomotives of the type employing removable engine units.

My invention is disclosed herein in connection with locomotives of the type having a multiplicity of engine-generator units that are individually removably mounted upon a locomotive frame, the power units being disposed preferably transversely of the locomotive frame and disposed in relatively close side by side relation to each other so as to occupy a minimum space lengthwise of the locomotive although my invention is applicable to other arrangements of removable power units. The term "cab" as herein used refers to the wall and roof structure for enclosing the power equipment.

The expeditious removability of the power units permits a disabled unit to be quickly bodily removed from the locomotive and replaced with an operative unit thereby allowing the locomotive to remain in service while the disabled engine or generator is being repaired in a shop. Hence it is not necessary to keep the engine locomotive out of service while the repair work is being done. Such removal and replacement of a unit involves complications and difficulties that have heretofore been met only by providing a cab section or power unit hood that was a complete integral part of the power unit.

It is an object of my invention to provide an improved cab structure that will permit quick removal and replacement of a unit and still provide a suitable housing for the power units that will be satisfactory in appearance and stability as well as insure effective weatherproofing when the power unit is mounted on the frame and give a high degree of accessibility to the engine and generator when a unit is removed, all without requiring any appreciable thought or attention on the part of the operator. A further object is to provide an improved cab structure that is relatively simple in construction, operation and maintenance together with obtaining the foregoing advantages.

A still further object is to provide an improved sectional cab structure so arranged that individual power units may be removed from or replaced on the engine frame while the remaining units and their sectional cab structures continue in place and yet when a unit is replaced its cab section is automatically sealed in position so as to form a continuous weather resisting structure over the whole of the power units.

Other objects and advantages will be more apparent to those skilled in the art from the following description of the accompanying drawings in which:

Fig. 1 is a side view of a locomotive embodying my improved cab structure;

Fig. 2 is an enlarged partial sectional view of the front end of the locomotive;

Fig. 3 is a transverse section through one engine unit and the cab taken substantially on the line 3—3 of Fig. 2;

Fig. 4 is an enlarged transverse section of the sealing joints between adjacent cooling systems taken substantially on the line 4—4 of Fig. 3;

Fig. 5 is a transverse section taken substantially on the line 5—5 of Fig. 3 showing the relation of the sealing channels to the transverse roof edges of the cooling system; and Fig. 6 is an enlarged section of the sealing joint along the upper edge of the side walls.

In the particular embodiment of the invention disclosed herein, I have shown a multiple power unit locomotive having a bed frame 1 on which is mounted a cab provided with an engineer's compartment 2 and an auxiliary equipment compartment 3. The cab also houses a plurality of power units generally indicated at 4, these power units being placed in two groups spaced apart at their center to provide a compartment 5 for air compressors or other apparatus. The frame 1 is mounted upon suitable trucks 6 and 7 with electric motor driven driving wheels while leading and guiding trucks 8 and 9 support the ends of the truck frame 6 and 7. The frame is supported on the trucks 6 and 7 through usual center pins 10 and 11 and the trucks are connected together through a connecting pin 12.

Each power unit broadly consists of an internal combustion engine 17 preferably a Diesel engine either of a simple vertical type with the cylinders in line or of the V type as specifically shown. Also formed as a part of the power unit is a generator 19 preferably formed as a unitary part of the engine frame as by being bolted or otherwise secured to the end thereof. The power unit is supported upon the bed frame through separable supporting brackets 41 and pins 22 connected respectively to the sides of the engine and generator and to the frame 1, there being four sets of such brackets. These are so constructed that the power unit may be lifted vertically from the frame 1 or during replacement of a unit the upper tapered ends of pins 22 enter the bracket openings to properly center and guide the power unit.

The details of construction of the engine, generator and other parts of the locomotive structure do not constitute a part of my invention except insofar as the engine cooling system forms a sectional part of the cab structure in cooperation with the side members thereof, the power units being offset to one side to provide a walkway along the other side.

My improved cab structure consists of side walls 27 permanently secured to the locomotive frame and extending as a smooth surface preferably for the full length of the locomotive. At the compartment 5 the side walls may sweep across the top to form a continuous integral structure but other than at this point and at the compartment ends 2 and 3 the side walls terminate in horizontal edges 28. To complete the covering of the power units and to allow the latter to be easily and freely vertically removed from or replaced on the engine frame I employ the individual cooling systems for the respective power units as a separable portion of the cab structure, specifically the roof. Briefly, the individual cooling systems include cooling radiators 30 and 31 supported in substantially opposed horizontal passageways formed by a lower horizontal wall 32 and an upper wall 33, these walls terminating at their outer ends in lateral openings 36 and 37 while a central opening 38 is formed in wall 33. The transverse walls 39, Fig. 5, close the side of each passageway. A central vertical axis blower 40 circulates air preferably inwardly through openings 36 and 37 and thence out through central opening 38. The blower is driven from an auxiliary generator 41 through a belt and pulleys 42 and shafts 43 and 44 connected together through suitable bevel gearing diagrammatically indicated at 45.

The sheet metal wall 32 is preferably curved downwardly and terminates along each side in straight horizontal edges provided with inwardly turned members 46 forming a horizontal sealing channel filled with relatively soft rubber, such as sponge rubber. These channels overhang the horizontal edges 28 of the permanent side walls 27 whereby the edges 28 automatically engage and become embedded in the sealing rubber when a power unit is in position. An effective seal against rain, wind or other adverse weather conditions is thus automatically established and maintained and at the same time a smooth continuous appearance of the cab is provided. The sealing joint is of such a nature that it automatically separates when the power unit is bodily lifted by suitable eye-bolt and lifting crane connections to four stanchions such as 48 and 49 secured respectively to the engine and generator through brackets 50 and 51 on each side of the power unit. The cooling system is suitably supported on the stanchion so that each power unit and its respective cooling system forms a self contained unit.

To insure adequate sealing transversely across the top of the cab structure, I have provided U-shaped channel members 53 between each power unit extending preferably upwardly from bed frame 1 to act as a reinforcement of both side walls 27 and then slightly curved at the corners to extend horizontally across the top at 54 with the channel exposed upwardly. The transverse edges of the bottom sheet 32 are provided with channels 55, Fig. 5, extending along said edges and turned down so that the adjacent edges of successive units extend down into the permanent horizontal channel portion 54. The channels 55 are filled preferably with soft rubber so that the edges of the channel portion 54 become firmly embedded in the rubber to provide an effective seal crosswise of the units. Here again no mechanical connections are required to effect the sealing action and as a result the individual power units may be bodily lifted or replaced and the seal is automatically broken or re-established, all without any effort, thought or attention on the part of the operator. Any rain falling between the adjacent units will run off in the channel 54 to the sides of the cab. Another advantage of my improved sealing arrangement is that when a unit is completely removed it is entirely open around its sides and ends, it being covered only by the cooling system which forms a self-contained part of the power unit. Hence no time or labor is required to remove side panels from a disabled power unit. These desirable and expeditious features are coupled with the further function that when the units are completely assembled the cab sections form a continuous smooth appearance throughout the length of the locomotive.

It will of course be understood that various changes in details of construction and arrangement of parts may be made by those skilled in the art without departing from the spirit of the invention as set forth in the appended claims.

I claim:

1. A cab structure for a locomotive of the type having a frame and a plurality of vertically removable engine power units mounted thereon comprising, in combination, cab side walls normally secured to said frame and extending for the full portion of the locomotive length that contains said plurality of power units, a cooling system for each of said engines formed as a self contained integral part of the respective power unit and superimposed over the same to form a roof section of the cab structure, said roof sections of the respective units extending from one side wall to the other in close transverse contiguous relation to each other and being vertically separable from the side walls and from each other, and sealing means interposed between said side walls and said roof sections whereby upon vertical removal of a power unit and roof section said sealing connection of such unit is automatically disconnected.

2. A cab structure for a locomotive of the type having a frame and a plurality of vertically removable power units placed in side by side relation to each other and extending transversely of the frame comprising, in combination, normally fixed cab side walls terminating in upper substantially horizontal edges, transverse sealing members extending from one side wall to the other wall at the top thereof and between adjacent power units, individual roof sections for the respective power units formed as a unitary part thereof, and means for effecting a transverse sealing action between said individual roof sections and said transverse members.

3. A cab structure for a locomotive of the type having a frame and a plurality of vertically removable power units placed in side by side relation to each other and extending transversely of the frame comprising, in combination, cab side walls normally fixed to said frame and terminating in upper substantially horizontal edges, channel sealing members extending transversely from one side wall to the other wall at the top thereof and between adjacent power units, individual roof sections for the respective power units formed as a unitary part thereof, and means for effecting a sealing action between said individual roof sections and said transverse channel members as well as with said upper edges of the side walls, whereby upon lifting of any given power unit the roof section thereof is automatically lifted and removed and said sealing connections are broken and when the power units and roof section are replaced the sealing connections are automatically re-established.

4. A cab structure for a locomotive of the type having a frame and a plurality of vertically removable power units mounted transversely thereon in side by side relation to each other comprising, in combination, normally fixed walls forming the sides of the locomotive along the whole portion of length thereof that contains all of said removable units, and means forming separate removable roof sections for the individual power units each roof section terminating in substantially contiguous relation to said side walls and to each other along their transverse edges to form a substantially continuous cab and roof enclosure, whereby upon removal of any one of said roof sections and its power unit the side walls remain in place and the remaining power units are covered by their respective roof sections.

5. A cab structure for a locomotive of the type having a frame and a plurality of vertically removable power units mounted thereon in relatively close relation to each other comprising, in combination, normally fixed walls forming the sides of the locomotive along the whole portion of length thereof that contains all of said removable units, and means forming separate roof sections for the individual power units, each roof section being formed as a self-contained unitary part of its power unit and removable therewith, said roof sections for the respective power units terminating in substantially contiguous relation to said side walls and to each other in a transverse direction to form a substantially continuous cab enclosure, whereby upon removal of said power unit and roof section the side walls remain in place.

6. The combination set forth in claim 4 further characterized by the provision of transverse members extending from substantially one side wall to the other at the top thereof and between adjacent power units so as to have a relatively close relation to the adjacent transverse edge portions of successive roof sections thereby to provide an effective sealing function.

7. The combination set forth in claim 4 further characterized by the provision of channel sealing members extending transversely from one side wall to the other at the top thereof and between adjacent power units, each of said sealing members having its channel groove facing outwardly, and the individual roof sections for the respective power units having inwardly turned flanges along their transverse edge portions to be received in the channel groove.

HARRY B. PETERSON, Jr.